United States Patent [19]

Pärsson

[11] Patent Number: 4,512,609
[45] Date of Patent: Apr. 23, 1985

[54] ARRANGEMENT IN A VEHICLE SEAT

[75] Inventor: Nils O. Pärsson, Trollhättan, Sweden

[73] Assignee: Saab-Scania AB, Sweden

[21] Appl. No.: 479,031

[22] Filed: Mar. 25, 1983

[30] Foreign Application Priority Data

Mar. 30, 1982 [SE] Sweden ............................. 8202022

[51] Int. Cl.³ ......................... B60N 1/02; A47C 1/02
[52] U.S. Cl. .................................. 297/331; 296/65 R
[58] Field of Search ............... 297/331, 335, 336, 313; 296/69, 65 R

[56] References Cited

U.S. PATENT DOCUMENTS 2,331,203 10/1943 Lee ..................................... 297/331
3,282,625 11/1966 Logan ............................. 296/69 X

FOREIGN PATENT DOCUMENTS 4484   3/1979 European Pat. Off. .
41411  9/1981 European Pat. Off. .
1381056 10/1964 France ................................... 296/69
131221 10/1979 Japan ................................... 297/331
2068216 8/1981 United Kingdom ............... 297/331

Primary Examiner—James T. McCall
Attorney, Agent, or Firm—Ostrolenk, Faber, Gerb & Soffen

[57] ABSTRACT

The invention relates to an arrangement in a passenger seat of a vehicle, preferably the back seat in a passenger car, for re-arranging said seat, including a seat cushion and a back cushion, the former being articulatedly connected via a link to the vehicle body and being arrangeable between a normal sitting position and a retracted substantially vertical loading position. The back cushion is pivotably connected to the vehicle body and arrangeable between a normal back support position and a swung-down substantially horizontal loading position. In their respective normal positions the rear end of the seat cushion is situated under the lower end of the back cushion. With the object of facilitating the movement of the seat cushion from sitting position to tipping position, especially for large thickness of the back cushion upholstery, the invention is substantially distinguished in that the link is pivotably attached to the seat cushion via a first joint and to the body via a second joint so that the first joint in the normal sitting position of the seat cushion is situated closer to the back cushion than the second joint and in that the first joint permits a substantially parallel displacement of the seat cushion from its normal sitting position to a tipping position, whereby the distance (d) between said positions is greater than a distance (a) between the rear end of the seat cushion and the lower forward edge of the back cushion in the normal sitting position of the seat cushion.

4 Claims, 1 Drawing Figure

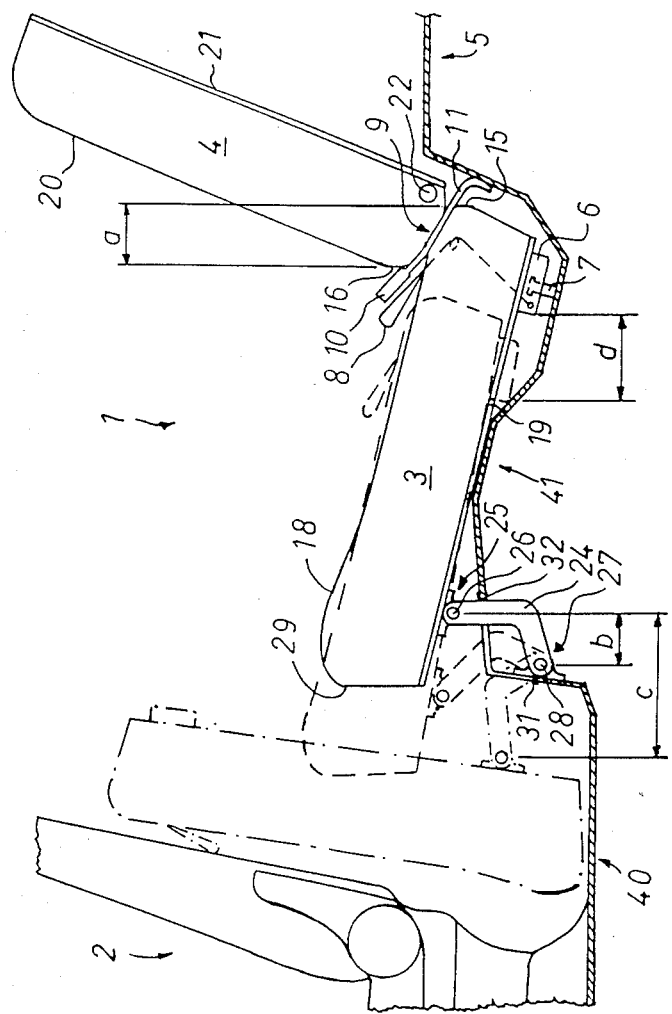

ARRANGEMENT IN A VEHICLE SEAT

The present invention relates to an arrangement in a passenger seat in a vehicle, preferably a passenger car back seat, for re-arranging said seat, comprising a seat cushion and a back cushion.

Re-arrangeable back seats are already utilized in vehicles, and in a known embodiment the manual re-arrangement of the seat cushion is initiated by releasing a catch normally keeping the seat cushion secured to the body. After being released, the seat cushion is swung up to a substantially vertical attitude immediately behind the front seats. Swinging the seat cushion up is achieved by gripping the back edge thereof with one hand and pulling it obliquely upwards. Considerable resistance to this movement is caused by the upholstery of the back cushion, the lower forward edge of which must be compressed to allow passage for the seat cushion.

Safety belts are usually provided in the back seat for the use of the passengers sitting there, portions of these belts generally projecting out from the junction between the seat cushion and the back cushion. These safety belt portions further increase the difficulty of swinging the seat cushion, particularly when swinging the seat cushion back into a normal sitting position. The safety belt portions must then be retained in a pulled-forward position with one hand simultaneously as the seat cushion, while pushed back into position, because of the compression of the upholstery tends to pull the belt portions into the junction so that they become inaccessible.

This trouble with re-arranging the seat cushion comes even more to the fore when the upholstery in the seat cushion and in the back cushion is made thicker to give increased sitting comfort. In such a case the overlap between the back cushion and the seat cushion increases, and as a consequence it becomes more difficult to push the seat cushion past the lower forward edge of the back cushion.

The present invention has the task of eliminating such drawbacks and relates to an arrangement for re-arranging a passenger seat in a vehicle, preferably passenger car back seat, comprising a seat cushion and a back cushion, said seat cushion being pivotably connected via at least one link to the vehicle body and arrangeable between a normal sitting position and a retracted substantially vertical loading position, the back cushion being pivotably connected to the vehicle body and arrangeable between a normal back support position and a downwardly-swung substantially horizontal loading position, the rear end of the seat cushion being situated under the lower end of the back cushion in their respective normal positions.

For facilitating re-arrangement between the respective positions, the inventive arrangement is distinguished by the link being pivotably connected to the seat cushion via a first joint and to the body via a second joint such that in the normal sitting position of the seat cushion the first joint is situated closer to the back cushion than the second joint, and such that the first joint allows substantially parallel displacement of the seat cushion from its normal sitting position to a tipping position, the distance between said positions being greater than a distance between the rear end of the seat cushion and the lower front edge of the back cushion, in the normal position of the seat cushion.

A division of the re-arranging movement of the seat cushion is achieved by the inventive arrangement. Accordingly, from the normal sitting position of the seat cushion there is an initial planar movement in a direction forwards, followed by a swinging movement. During the latter phase, the seat cushion is swung from a substantially horizontal position to a substantially vertical position. The movement in the plane of the seat cushion means that compression of the respective cushions is not necessary for achieving the rearrangement of the seat cushion.

Other features distinguishing the invention will be apparent from the appended claims and the subsequent description here of an embodiment exemplifying the invention. The description is undertaken with reference to an accompanying FIGURE on which in a side view there is seen the back seat in a passenger car in three different positions of its seat cushion.

The back seat 1 comprises a seat cushion 3 and a back cushion 4. The normal sitting position for the seat cushion 3 is shown in full lines in the FIGURE, a forward tipping position is shown by dashed lines and a tipped up vertical loading position behind the front seats of the car is shown by chain-dotted lines.

In a normal sitting position the seat cushion 3 and back cushion 4 are locked to the vehicle body 5 with the aid of catch means 6 of which only the catch means of the seat cushion 3 is shown in the FIGURE. Said catch means 6 coacts with a catch bolt 7 attached to the vehicle body 5. The catch means 6 is released from the bolt 7 by manually pulling a sling 8 attached via a flexible strap to the catch means 6. The sling 8 is accessible in the junction 9 between the seat cushion 3 and the back cushion 4. Catch means 10 for the safety belts (not shown) of the back seat passengers also thrust out from the junction 9. The catch means 10 are attached to yielding stems 11 in turn attached to body portions lying behind the seat cushion 3.

The junction is a common contact line between the seat cushion 3 and the back cushion 4 when the back seat 1 assumes a normal sitting condition. The rear end 15 of the seat cushion 3 is then at a horizontal distance behind the lower forward edge 16 of the back cushion 4, said distance being denoted by a in the FIGURE. The tendency towards increased sitting comfort in passenger cars brings with it the requirement of increased upholstery thickness in the back seat 1 and thereby a tendency for the distance a to increase.

The seat cushion 3 comprises a seat mattress 18 conventionally attached to a seat panel 19. In a corresponding way, the back cushion 4 is composed of a mattress 20 and a panel 21 connected thereto. The back cushion 4 is conventionally mounted about a horizontal pin 22, thereby enabling the back cushion 4 to be swung into a horizontal loading position.

The forward portion of the seat cushion 3 is pivotably connected to the floor portion 40 of the body via a link 24. A joint member 25 is attached to the underside of the panel 19 for this purpose, and one end of the link 24 is pivotably mounted on a horizontal pin 26 in said member. At its other end the link 24 is pivotably mounted on a horizontal pin 28 in a joint member 27 attached to the body floor 40. Also, in the normal sitting position of the seat cushion, the seat panel 19 is adapted to engage against a support portion 41 built up from the body floor 40 and which will be described in detail below.

In the inventive embodiment, the pin 26 is preferably situated closer to the back cushion 4 than the pin 28 when the seat cushion 3 assumes its normal sitting position. In the horizontal plane, said distance between pins 26, 28 is denoted by b. During rearrangement of the seat cushion 3 from a normal sitting position to a forwardly tipped loading position, the pin 26 is displaced forwards in the horizontal plane a distance denoted by c in the FIGURE. Basic to the inventive solution is that the distance c is greater than the distance a.

From the functional aspect, it is furthermore advantageous if the distance b is more than 75% of the distance a. There is thus namely ensured that the seat cushion 3 can be moved from sitting position to tipping position without a tendency to press against the lower forward edge of the back cushion 4. By rounding off the lower forward edge 16 of the back mattress 20 the seat cushion 3 can be given a swinging movement before completely travelling the distance a.

The support portion 41 built up from the body floor 40 is preferably situated halfway between the front and rear edges of the seat cushion 3 in a normal sitting position, i.e. between the joint member 25 holding the seat cushion 3 to the link 24 and the catch mechanism 6 attached to the seat panel 19. In order to obtain a comfortable angle of slope on the seat cushion, the joint member 25 is situated above both the support portion 41 and the location where the catch means 6 is supporting the catch bolt 7. Furthermore, the body floor 40 is formed with a free distance d in the horizontal plane behind the support portion 41 such that the catch means 6 obtains space for its motion when the seat cushion 3 is moved forwards from its normal sitting position. The free distance d should exceed the distance a, since on contact with the support portion 41 by the catch means 6 there is begun the terminating tipping movement of the seat cushion 3 for its final rearrangement.

In practice, the movement of the seat cushion 3 from its sitting position to its tipping position is performed by the sling 8 being pulled slopingly upwards and forwards with one hand. The catch means is then released from the catch bolt 7 and under continued pulling the seat cushion 3 is displaced in substantially parallel motion forwards while gliding against the support portion 41 at the same time as the link 24 is caused to pivot about its joints 25, 27. The parallel displacement generally merges into a tipping movement when the distance a has been travelled, and the tipping movement begins at the latest when the catch means 6 comes against the support portion 41 during the displacing movement. During the tipping movement the seat cushion is caused to assume a substantially vertical position immediately behind the front seats 2 of the car, in a so-called loading position. In such a position the seat cushion 3 can be supported by the body floor 40 and/or the link 24 can be adapted to bear against an abutment edge 31 arranged for the purpose in the front part of the support portion 41. A corresponding abutment edge 32 can also be formed for supporting the link 24 when the seat 3 assumes a normal sitting position.

After the re-arrangement of the seat cushion 3 to the so-called loading position, there follows a conventional step in which the back cushion 4 is swung down to a substantially horizontal position, the then upper side of the back panel 21 serving as a loading surface.

The return of the back seat 1 to its normal sitting condition is done in the reverse order, involving that the return of the seat cushion 3 is terminated with a parallel movement during which the catch means 6 is brought into coaction with the catch bolt 7, the seat cushion 3 being then automatically locked to the vehicle body 5. Since the safety belt catches 10 are attached to the comparatively stiff resilient stems 11, no further measure is required to ensure that these catches assume correct positions during said return movements of the back seat 1.

The above described embodiment of the invention is not to be taken as restricting the invention, since the latter can be modified in a plurality of embodiments within the scope of the following claims.

I claim:

1. Arrangement in a passenger seat in a vehicle, preferably a passenger car back seat, for re-arranging said seat, including a seat cushion and a back cushion, said seat cushion being pivotably connected via at least one link to the vehicle body and separately arrangeable between a normal sitting position and a retracted substantially vertical loading position, the back cushion being pivotably connected to the vehicle body and separately arrangeable between a normal back support position and a downwardly-swung substantially horizontal loading position, the rear end of the seat cushion being situated under the lower end of the back cushion in their respective normal positions, characterized in that the link is pivotably attached to the seat cushion via a first joint and to the body via a second joint and in that in the normal sitting position of the seat cushion the first joint is situated closer to the back cushion than the second joint and above any supporting points between the seat cushion and the body, and in that the second joint is situated behind the forward end of the seat cushion, whereby a substantially parallel displacement of the seat cushion from its normal sitting position to a tipping position is allowed, the distance (d) between said positions being greater than a distance (a) between the rear end of the seat cushion and the lower forward edge of the back cushion in the normal sitting position of the seat cushion.

2. Arrangement as claimed in claim 1 characterized in that in the normal sitting position of the seat cushion the horizontal distance (b) between the first and second joint is more than 75 percent of the distance (a) between the rear end of the seat cushion and the lower forward edge of the back cushion.

3. Arrangement as claimed in claim 1 wherein the seat cushion is provided at its rear end with a manually actuable catch mechanism which coacts for engagement with a catch member attached to the body in a rearwardly directed displacing movement of the seat cushion, for securing the seat cushion relative the body in a normal sitting position.

4. Arrangement as claimed in claim 3, characterized in that safety belt portions including yielding stem members attached to the body project forward between the rear end of the seat cushion and the forward edge of the back cushion in the normal sitting position of the seat cushion.

* * * * *